United States Patent
Lee et al.

(10) Patent No.: US 7,618,145 B2
(45) Date of Patent: Nov. 17, 2009

(54) HEAT DISSIPATION DEVICE OF PROJECTOR

(75) Inventors: Hung-Lin Lee, Chu-Nan (TW); Yu-Min Kuo, Chu-Nan (TW); Chih-Chung Yang, Chu-Nan (TW)

(73) Assignee: Coretronic Corporation, Chu Nan, Miao Li County (TW)

( * ) Notice: Subject to any disclaimer, the term of this patent is extended or adjusted under 35 U.S.C. 154(b) by 501 days.

(21) Appl. No.: 11/455,862

(22) Filed: Jun. 20, 2006

(65) Prior Publication Data

US 2007/0013874 A1    Jan. 18, 2007

(30) Foreign Application Priority Data

Jul. 15, 2005    (TW) .............................. 94124051 A

(51) Int. Cl.
*G03B 21/18*    (2006.01)

(52) U.S. Cl. .......................................... 353/61; 353/57

(58) Field of Classification Search .................... 353/57, 353/58, 60, 61
See application file for complete search history.

(56) References Cited

U.S. PATENT DOCUMENTS

| | | | |
|---|---|---|---|
| 6,582,082 B2 * | 6/2003 | Tiao et al. | 353/57 |
| 7,014,320 B2 * | 3/2006 | Shiraishi | 353/57 |
| 7,140,734 B2 * | 11/2006 | Lim | 353/61 |
| 2003/0076683 A1 * | 4/2003 | Chang | 362/294 |
| 2004/0212784 A1 * | 10/2004 | Hsu | 353/61 |

* cited by examiner

*Primary Examiner*—William C Dowling
*Assistant Examiner*—Danell L Owens
(74) *Attorney, Agent, or Firm*—Birch, Stewart, Kolasch & Birch, LLP

(57) ABSTRACT

A heat dissipation device of a projector for transmitting the heat from a lamp out of the projector, the heat dissipation device comprises a fan, a diversion duct, and a division vane. The diversion duct is used for changing the direction of the air flow that generated by the fan to a second direction from a first direction; and the division vane is disposed within the diversion duct for splitting the air flow to discharge the air flow with uniform distributing heat off the diversion duct.

16 Claims, 4 Drawing Sheets

HEAT DISSIPATION DEVICE OF PROJECTOR

FIELD OF THE INVENTION

The present invention relates to a heat dissipation device, especially for a heat dissipation device of a projector.

DESCRIPTION OF THE RELATED ART

With advantages of large display monitor and portable, projectors are already become important display devices nowadays.

A light for projecting an image is generated by a lamp, however, heat generated accompany with the light results high risk of internal elements damage of the projector. A common solution for solving the heat problem is disposing a fan inside the projector for blowing the heat outside the projector. Generally, disposing the fan on the front side of the projector is convenient for discharging off the heat.

The temperature of an outer covering of the projector is demanded lower than 95 degrees centigrade by safe standards. But while the power of the lamp is higher than 200 watts, the front side of the outer cover and vicinities of the front side of the outer cover always get a temperature higher than standards.

Moreover, discharging heat from the front side of the outer cover results problems like light leakage, further influence the contrast value of the image.

Refer to FIG. 1, which shows a conventional projector 2. The front side of the conventional projector 2 is defined as S2, and the lateral side of the projector 2 is defined as S1. The projector 2 comprises a heat dissipation device 4, a lamp 6, and the heat dissipation device 4 further comprises a fan 402 and a diversion duct 404.

As shown, the fan 402 is disposed within the projector 2 and near the lamp 6 for generating an air flow to take away the heat from the lamp 6 along a D1 direction. The D1 direction is defined as the direction from interior of the projector 2 to the front side S1 of the projector 2.

The air flow with heat entry the diversion duct 404 along D1 direction then turning to a D2 direction while leaving the diversion duct 404. The D2 direction is defined as a direction from the front side S2 to the lateral side S1 of the projector 2. Hence, the air flow with heat discharges off the projector 2 through the lateral side S1 of the projector 2.

However, the conventional projector 2 can't totally prevent the problem of the light leakage, which is the lights leaking out from openings of the lateral side S1 of the projector 2.

Please refer to FIG. 2, which shows a temperature distribution diagram of the lateral side S1 under the lamp 6 with power higher than 200 watts. As FIG. 2 shows, most portion of the lateral side S1 have temperature T1 lower than 95 degrees centigrade, but the portion of discharging air flow have higher temperature T0. Turning around 180 degrees increases difficulties of discharging the air flow. Adding one more fan is one solution for the problem, but the cost of the projector increases too. Hence, a solution for lowering the outer cover temperature efficiency and preventing the light leakage is needed.

SUMMARY OF THE INVENTION

The object of the present invention is to provide a heat dissipation device of a projector for discharging a turning air flow with uniform distributing heat, which has temperature under the safe standard off the lateral of the projector.

Another object of the present invention is to provide a heat dissipation device which may solve problems of light leakage.

Accordingly, a heat dissipation device of a projector disclosed herein. The heat dissipation device comprises a fan, a diversion duct and a division vane. The fan is disposed near the lamp of the projector for generating an air flow to take away the heat from the lamp along a first direction. The diversion duct is used for changing the direction of the air flow to a second direction from the first direction. The division vane is disposed within the diversion duct for splitting the air flow to discharge the air flow with uniform distributing heat off the diversion duct form the lateral side of the projector.

The present invention provides a heat dissipation device for well applicable for a projector. The air flow with heat may turn well to discharge off the projector by setting a division vane, the design of the first opening, the second opening and the fin on the division vane helps to maintain the uniform and safe temperature value of the projector. Moreover, the position of the division vane could prevent the light leakage from the lateral side effectively; hence the problems mentioned in the foregoing background section are solved through the present invention.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
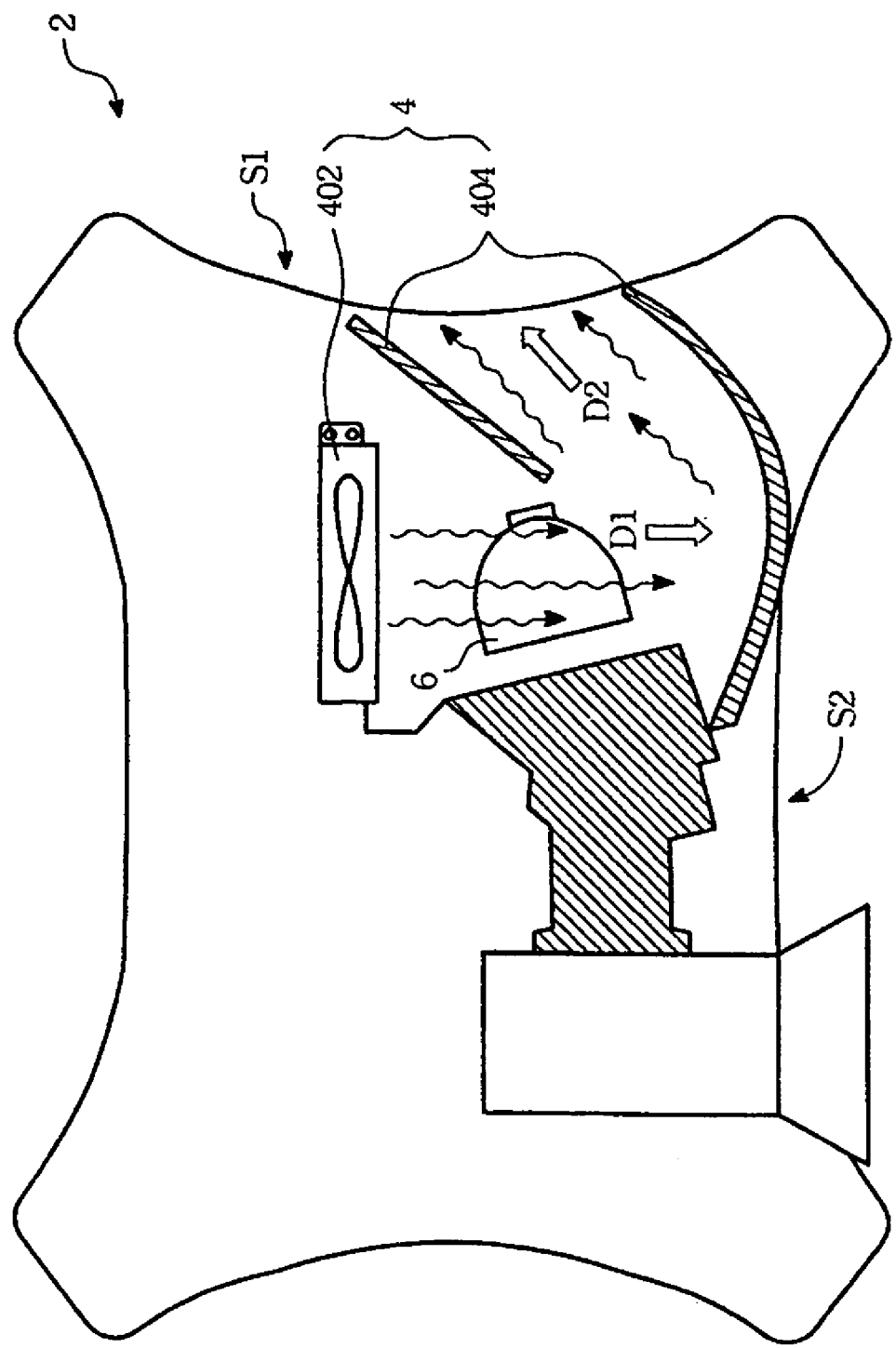
FIG. 1 shows a conventional projector.
Figure 2:
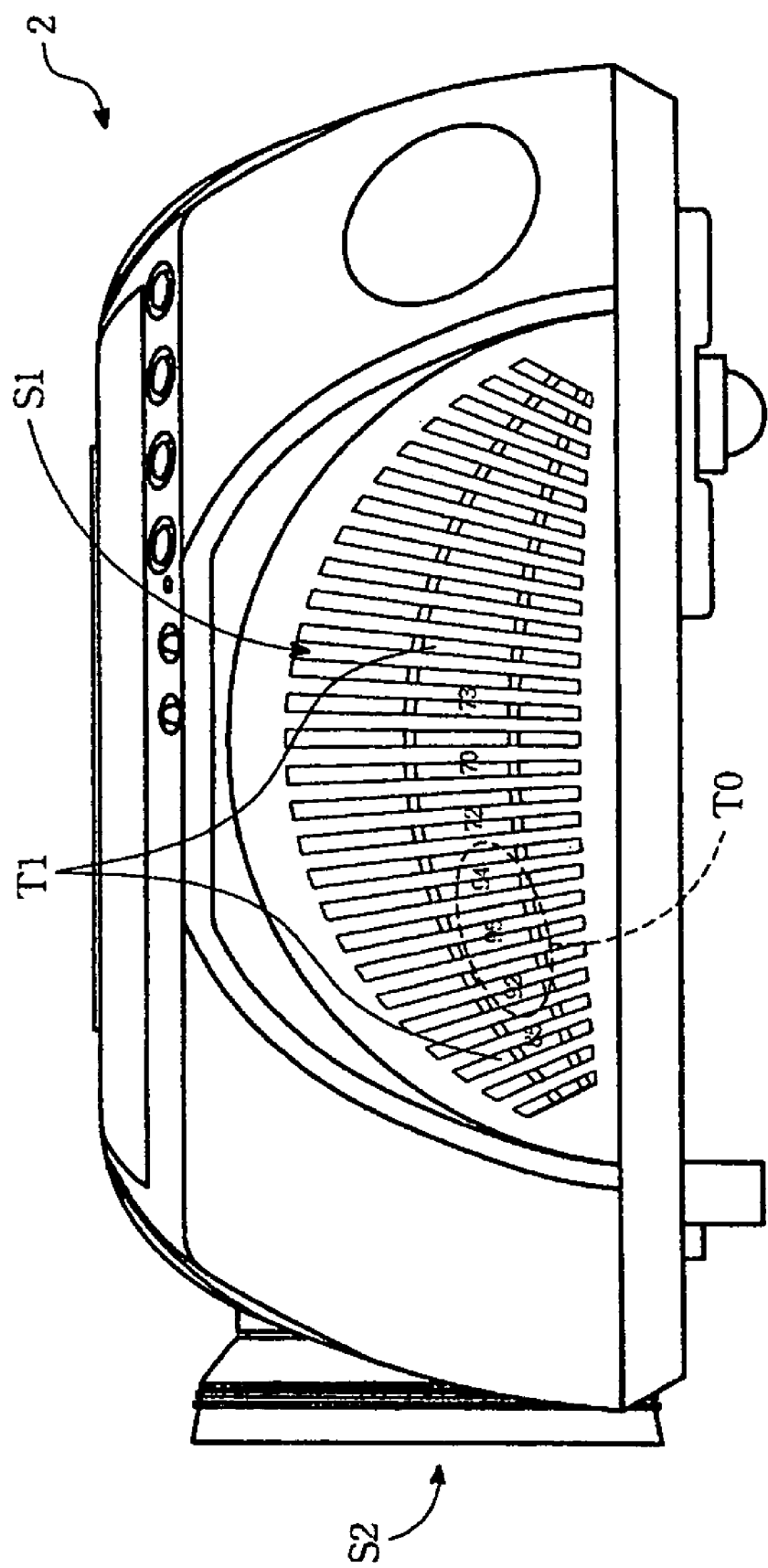
FIG. 2 shows a temperature distribution diagram of the lateral side of the conventional projector under a lamp with power higher than 200 watts.
Figure 3:
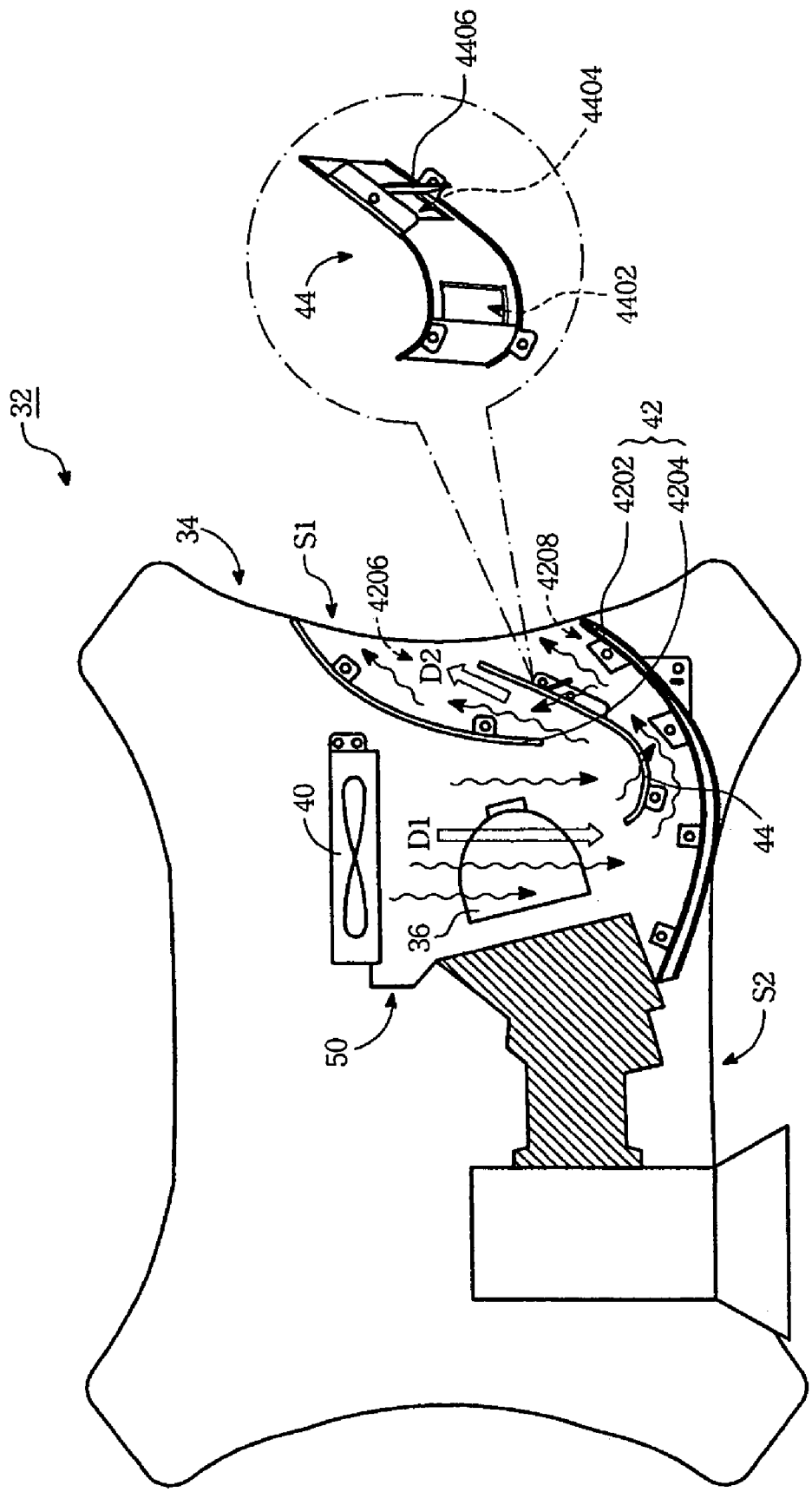
FIG. 3 shows a schematic view of a heat dissipation device of a projector of the present invention.

Please refer to FIG. 3, which shows an embodiment of a heat dissipation device 34 in accordance with the present invention. A projector 32 comprises the heat dissipation device 34 and a lamp 36, and the heat dissipation device 34 further comprises a fan 40, a diversion duct 42 and a division vane 44. The lamp 36 is used for providing a light for an image, however, heat is generated accompany with the light. The fan 40 is disposed near the lamp 36 for generating an air flow to take away the heat from the lamp 36 along a D1 direction.

As shown, the diversion duct 42 is disposed in the projector 32 and used for changing the direction of the air flow to a D2 direction from the D1 direction. Herein the D1 direction is defined as the direction from interior of the projector 32 to the front side S1 of the projector 2 and the D2 direction is defined as the direction from the front side S2 to the lateral side S1 of the projector 32. The division vane 44 is disposed within the diversion duct 42 for splitting the air flow to discharge the air flow with the uniform distributing heat off the diversion duct from the lateral side S1 of the projector 32.

The projector 32 further comprises a housing 50 for accommodating the lamp 36. The heat dissipation device 34 further comprises a first arc plate 4202 and a second arc plate 4204, the first arc plate 4202 is disposed near the front side S2 of the projector 32 and the concave side of the first arc plate 4202 faces the lamp 36, the second arc plate 4204 is disposed near the lateral side S1 of the projector 32 and the convex side of the second arc plate 4204 backs the lamp 36, wherein the second arc plate 4204 is extending along D2 direction. As FIG. 3 shows, the diversion duct 42 is composed of the first arc plate 4202 and the second arc plate 4204.

The division vane 44 is also an arc structure and disposed matching up the veering of the diversion duct 42; the division vane 44 divides the diversion duct 42 into a first duct 4206 and a second duct 4208. The first duct 4206 is disposed close to the concave side of the division vane 44 and faces the air flow along D1 direction, and the second duct 4208 is disposed close to the convex side of the division vane 44.

The division vane 44 further comprises a first opening 4402 for conducting part of the air flow within the first duct 4206 to the second duct 4208. The division vane 44 further comprises a second opening 4404 at the end of division vane 44 along the direction of the air flow (herein the term "end" is defined as the direction of the end of the air flow), and a fin 4406 is disposed on the end edge of the second opening 4404, wherein the fin 4406 is extending from the edge of the second opening 4404 to the second duct 4208 and conducting part of the air flow within the second duct 4208 to the first duct 4206. Herein the division vane 44 is a thin foil and made of metal material, the fin 44 is fabricated by punching processes disposed on the division vane 44.

Figure 4:
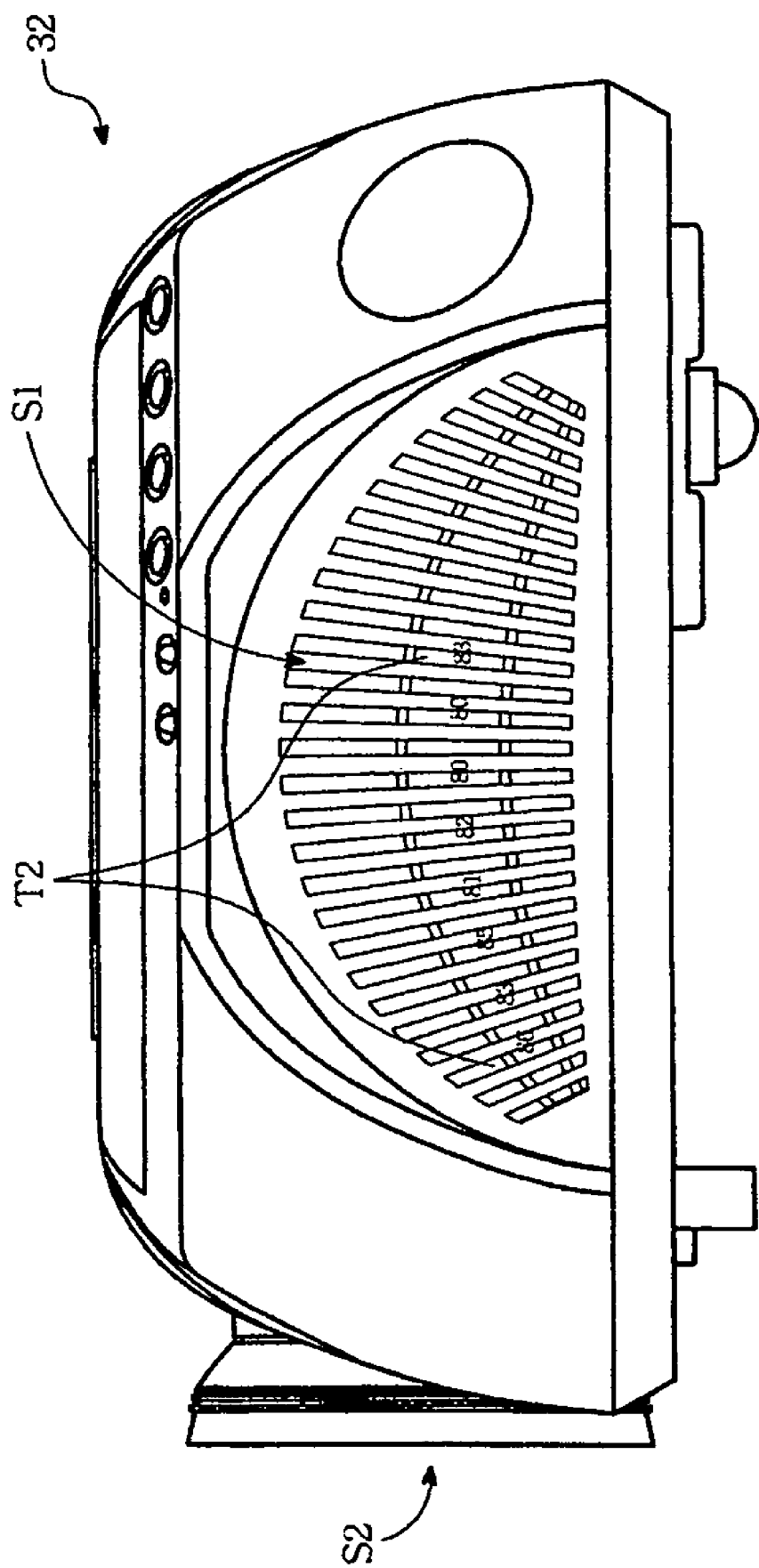
FIG. 4 shows a temperature distribution diagram of the lateral side of the projector of the present invention under a lamp with power higher than 200 watts.

Please refer to FIG. 4, the temperature T2 of whole lateral side S1 is even and lower than 95 degrees centigrade.

To sum up, the present invention provides the projector 32 and the heat dissipation device 34 for the projector 32. The air flow with heat may turns well to discharge off the projector 32 from the lateral side S1 of the projector 32 by setting the division vane 44. The air flow with the heat passes through the first opening 4402, the second opening 4404 and the fin 4406 disposed on the division vane 44 to maintain the uniform and safe temperature value of the air flow to discharge the air flow with the uniform distributing heat off the diversion duct from the lateral side S1 of the projector 32. Moreover, the position of the division vane 44 could prevent the light leakage from the lateral side S1 of the projector 32 effectively; hence the problems mentioned in the foregoing background section are solved through the present invention.

While the present invention has been particularly shown and described with reference to a preferred embodiment, it will be understood by those skilled in the art that various changes in form and detail may be without departing from the spirit and scope of the present invention.

We claim:

1. A heat dissipation device of a projector for transmitting heat from a lamp being inside the projector out of the projector, the heat dissipation device comprises:
   a fan disposed near the lamp for generating an air flow to take away the heat from the lamp along a first direction;
   a diversion duct for changing the direction of the air flow to a second direction from the first direction; and
   a division vane disposed within the diversion duct for splitting the air flow with the heat to discharge off the diversion duct, wherein the division vane is an arc structure and disposed matching up the veering of the diversion duct, the division vane dividing the diversion duct into a first duct and a second duct, the first duct disposed close to a concave side of the division vane and facing the air flow along the first direction, and the second duct disposed close to a convex side of the division vane.

2. The heat dissipation device of claim 1, wherein the first direction is defined as a direction from an interior of the projector to a front side of the projector, and the second direction is as a direction from the front side to a lateral side of the projector.

3. The heat dissipation device of claim 2, wherein the air flow is discharged off the lateral side of the projector through the diversion duct.

4. The heat dissipation device of claim 2, wherein the projector further comprises a housing for accommodating the lamp.

5. The heat dissipation device of claim 4 further comprises a first arc plate and a second arc plate, the first arc plate disposed near the front side of the projector and a concave side thereof facing the lamp, the second arc plate disposed near the lateral side of the projector and a convex side thereof backing the lamp and the second arc plate is extending along the second direction, wherein the first and second arc plates compose the diversion duct.

6. The heat dissipation device of claim 1, wherein the concave side of the division vane comprises a first opening for conducting part of the air flow within the first duct to the second duct.

7. The heat dissipation device of claim 1, further comprises a second opening disposed on an end of the division vane, and a fin disposed on an end edge of the second opening, wherein the fin is extending from the second opening to the second duct and conducting part of the air flow within the second duct to the first duct.

8. The heat dissipation device of claim 7, wherein the division vane is made of metal material and the fin is fabricated by punching processes.

9. A projector comprises:
   a lamp for generating a light;
   a fan disposed near the lamp for generating an air flow to take away heat from the lamp along a first direction;
   a diversion duct for changing the direction of the air flow to a second direction from the first direction; and
   a division vane disposed within the diversion duct for splitting the air flow with heat to discharge off the diversion duct, wherein the division vane is an arc structure and disposed matching up the veering of the diversion duct, the division vane dividing the diversion duct into a first duct and a second duct, the first duct disposed close to a concave side of the division vane and facing the air flow along the first direction, and the second duct disposed close to a convex side of the division vane.

10. The projector of claim 9, wherein the first direction is defined as a direction from an interior of the projector to a front side of the projector, and the second direction is defined as a direction from the front side to a lateral side of the projector.

11. The projector of claim 10, wherein the air flow is discharged off the lateral side of the projector through the diversion duct.

12. The projector of claim 10, further comprises a housing for accommodating the lamp.

13. The projector of claim 10, further comprises a first arc plate and a second arc plate, the first arc plate disposed near a front side of the projector and a concave side thereof facing the lamp, the second arc plate disposed near the lateral side of the projector and a convex side thereof backing the lamp and the second arc plate is extending along the second direction, wherein the first and second arc plates compose the diversion duct.

14. The projector of claim 9, wherein the concave side of the division vane comprises a first opening for conducting part of the air flow within the first duct to the second duct.

15. The projector of claim 9, further comprises a second opening disposed on the end of the division vane, and a fin disposed on the end edge of the second opening, wherein the fin is extending from the second opening to the second duct and conducting part of the air flow within the second duct to the first duct.

16. The projector of claim 15, wherein the division vane is made of metal material and the fin is fabricated by punching processes.

* * * * *